T. GRISENTHWAITE.
VALVE FOR PUMPS.
APPLICATION FILED AUG. 19, 1914.
1,146,247.
Patented July 13, 1915.
2 SHEETS—SHEET 1.
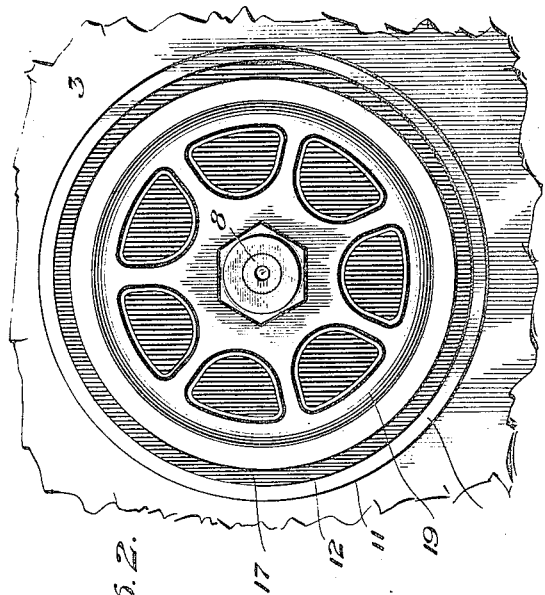
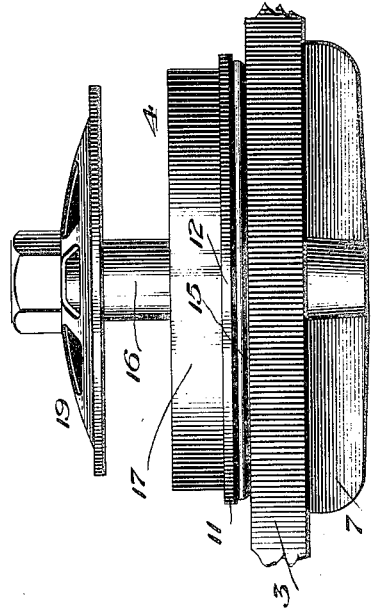
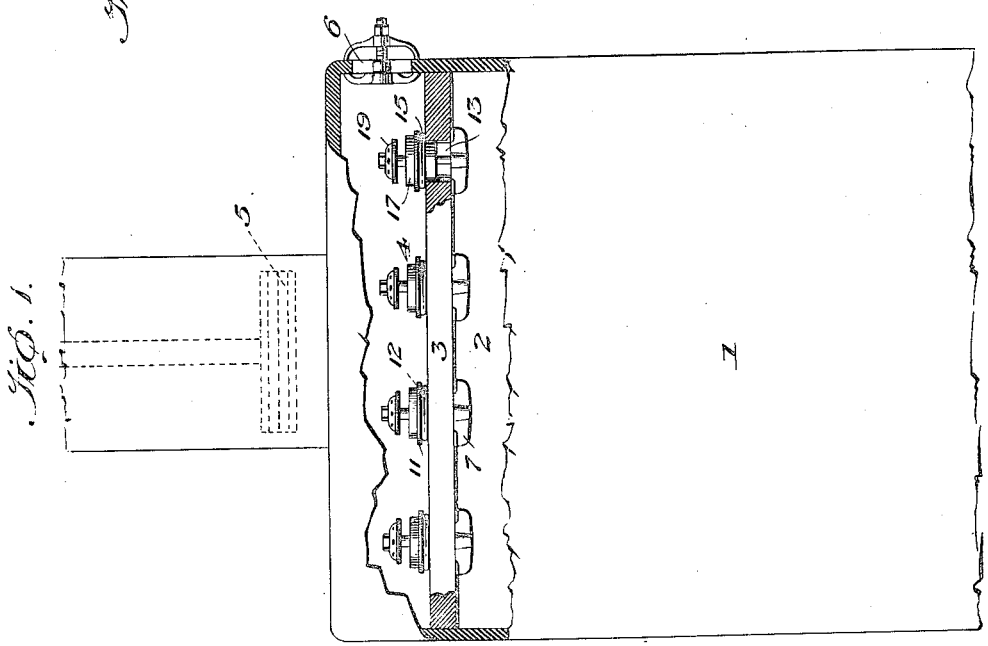

T. GRISENTHWAITE.
VALVE FOR PUMPS.
APPLICATION FILED AUG. 19, 1914.
1,146,247.
Patented July 13, 1915.
2 SHEETS—SHEET 2.
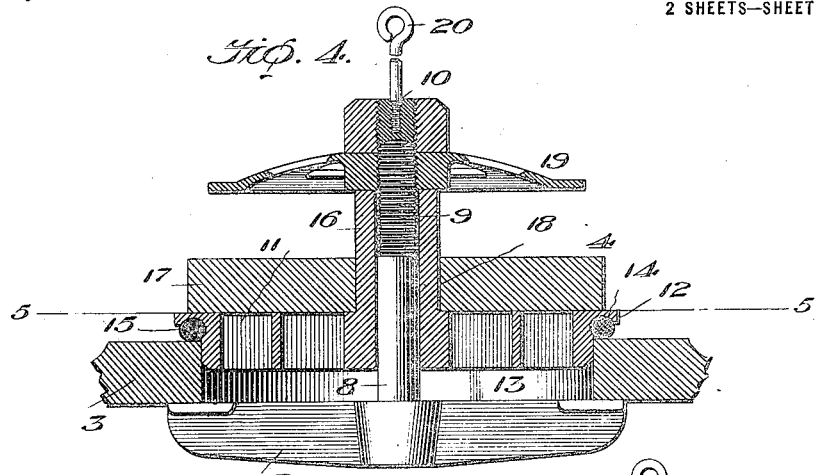
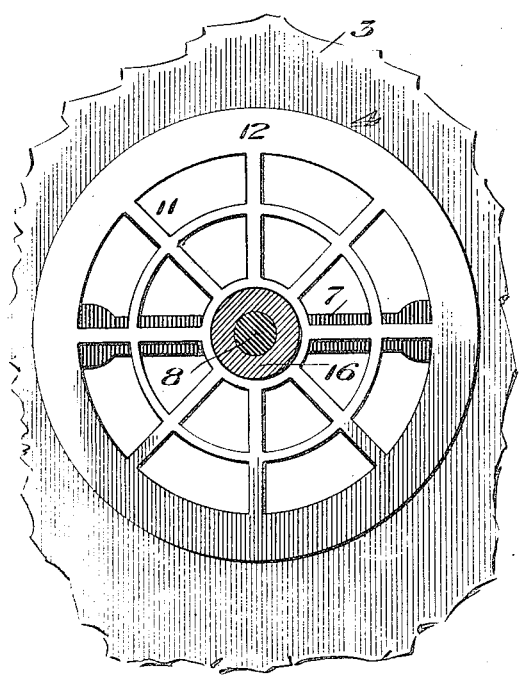
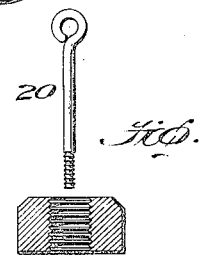
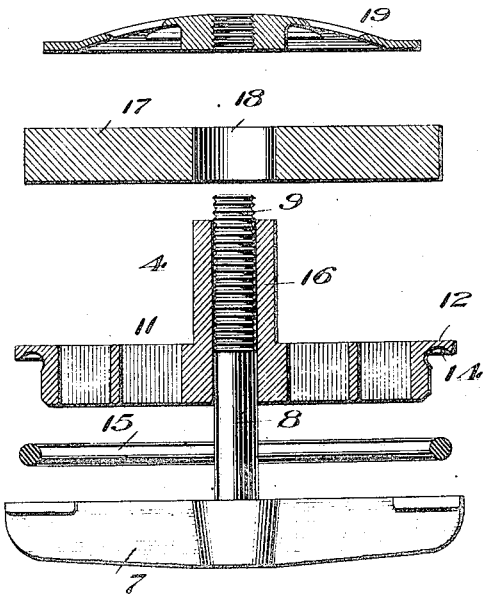
Witnesses
Inventor
Thomas Grisenthwaite
By his Attorney

UNITED STATES PATENT OFFICE.

THOMAS GRISENTHWAITE, OF FALL RIVER, MASSACHUSETTS.

VALVE FOR PUMPS.

1,146,247. Specification of Letters Patent. Patented July 13, 1915.

Application filed August 19, 1914. Serial No. 857,499.

*To all whom it may concern:*

Be it known that I, THOMAS GRISENTHWAITE, a citizen of the United States, residing at Fall River, in the county of Bristol and State of Massachusetts, have invented certain new and useful Improvements in Valves for Pumps, of which the following is a specification.

This invention relates to valves for pumps.

In that class of pumps employing a piston head, or partition in the pump chamber, which is provided with a number of independent valves, the valve construction heretofore generally used has been one which is permanently connected to the partition or piston head. In the course of time, the valve support rusts and the valve falls out, leaving an opening in the partition or piston head which has to be closed at high expense due to inaccessibility of the parts and in order to prevent interference with the operation of the remaining valves.

My object is to provide an improved valve, particularly the mounting thereof, whereby when a valve becomes damaged or needs repairs on a pump of the class set forth, the valve may be taken out and a new one substituted quickly and at slight expense.

The invention relates particularly to the improved mounting for the disk valve which is commonly used in pumps of this class, whereby the disk valve may be renewed at any time or, the entire valve mounting or structure may be taken out of, or replaced in, the partition or piston head of the pump chamber quickly and inexpensively.

The old form of valve support was intended to be permanently and directly connected to the partition or piston head, whereas my improved valve and valve support has a detachable and packed connection therewith so that it is readily removable, and means are provided for holding these parts in position while removing the disk valve when it is necessary to take it off or to substitute another therefor.

The invention is adapted for use on any water pump and either in a fixed partition or a movable piston.

One embodiment of the invention is set forth hereinafter and the novel features and combinations are recited in the appended claims.

In the accompanying drawings: Figure 1 is a side view broken away, showing a pump on which the valve may be used; Fig. 2, a detail plan looking toward the valve guard; Fig. 3, a side elevation showing the valve in position; Fig. 4, a vertical section; Fig. 5, a section on line 5—5, Fig. 4; and Fig. 6, a sectional view showing the different parts of the valve separated but in relative position for assembly.

The invention is illustrated in connection with a pump 1 having a pump-chamber 2, a header or partition 3 for carrying a plurality of valves 4 and a piston 5. The pump structure is shown in more or less diagrammatic form, it being only necessary to illustrate the use to which the invention is put. Pumps of this character are generally of the vertical type, the valve disks rising by suction when the piston 5 ascends and descending when it moves downwardly. There is usually provided in a pump of this character a hand-hole closure 6, whereby access may be had to the valves 4. In a pump of this character, if one of the valves 4 gets out of order, the efficiency of the pump is impaired. As now generally constructed, the supports for the valve disks are permanently secured to the header 3 and in the course of time rust out and fall into the chamber 1, thus leaving an opening in the header 3. This opening must be stopped or a new valve substituted, for otherwise the efficiency of the pump is greatly interfered with. Repairs of this character are difficult to make necessitating a shut-down and much expense.

With the present invention, the valve disks, which are usually of rubber or rubber composition, can be renewed at any time, easily and inexpensively, or, the entire valve support taken out of the header 3 with the same facility, due to the improved detachable connection which I have provided.

Referring to Figs. 4, 5, and 6, a portion of the header 3 is there shown. Instead of directly and permanently connecting the valve support to the header 3, I provide a yoke 7 to which is connected a stem 8 provided with external screw-threads 9 and internal screw-threads 10. The yoke is adapted to bear against the under side of the header 3. Slidably mounted on the stem 8, but having a close engagement therewith, is a valve plate or grid 11 which is provided with a flange 12. This grid fits into the opening 13 in the header 3, the flange 12 being larger than said opening. A peripheral groove 14 is provided to retain an annular packing ring 15 which is preferably circular in cross section, said ring being located between the flange 12 and the upper face of the header 3 and affording a tight, yet detachable, connection between the grid or plate 11 and the header 3. The grid is provided with a sleeve 16.

The disk valve 17, which is of rubber or rubber composition and of considerable thickness, has a hole 18 in its center which is freely slidable on the sleeve 16. The disk valve 17 is of a sufficient size to cover all of the openings in the grid or plate 11, but is no greater in diameter than the flange 12. Screwed to the externally threaded part 9 is a metal guard 19 which abuts the upper end of the sleeve 16 and limits the upward movement of the disk valve 17 when the said valve opens.

Referring to Figs. 4, 6, there is shown a screw-threaded pin or eye-bolt 20 which is adapted to be screwed into the internal threads 10 when it is necessary to remove the disk valve or the entire valve structure. This pin being provided with an eye, it affords means for connection to any supporting device for the purpose of holding the yoke 7 against the bottom of the header 3, thereby permitting the guard 19 to be unscrewed and the disk valve to be taken off.

On raising the grid 11, it may be removed or while the pin is holding the yoke 7 and, by manipulation, the yoke may also be removed through the opening 13 in the header. Thus, any or all of the parts of the valve may be readily taken out whenever repairs or substitution become necessary. Operations for this purpose may take place through the opening covered by the closure 6.

The removability of the grid 11 permits the placing of a new packing thereon when necessary.

Having thus described my invention, what I claim as new and desire to secure by Letters Patent, is:—

1. The combination with a support having an opening through which a fluid may pass, of a self-contained detachable valve and valve structure comprising a yoke adapted to bear against one side of the support, said yoke having a screw-threaded stem of uniform diameter, a grid or valve-seat bearing against the opposite side of the aforesaid support, a disk valve surrounding the stem and resting on the seat or grid and removable from said stem in a direction away from said yoke, and a valve guard screwed onto the stem and adapted to limit the play of the disk valve in relation to the seat or grid.

2. The combination with a support having an opening through which a fluid may pass, of a self-contained detachable valve and valve structure comprising a yoke adapted to bear against one side of the support, said yoke having a screw-threaded stem, a grid or valve-seat bearing against the opposite side of the aforesaid support and provided with a sleeve or hub which is slidable on said stem, a valve guard on the screw-threaded part of the stem and adapted to clamp the seat or grid and the yoke against opposite sides of the support, and a disk valve slidable on said sleeve or hub and adapted to play between the seat or grid and the guard.

3. The combination with a support having an opening through which a fluid may pass, of a yoke having a stem, said yoke being adapted to bear against one side of the support, a valve-seat or grid having a sleeve or hub slidably mounted on the stem, said seat or grid being adapted to bear against the other side of the support, packing interposed between the seat or grid and the support, a disk valve slidable on the sleeve or hub, a valve guard detachably connected to the stem and which secures the seat and yoke in position, and a suspending device having a detachable screw-threaded engagement with the end of the stem and arranged for the suspension of the yoke while the guard, valve, and seat are slipped over said suspending device when removing them.

In testimony whereof I affix my signature in presence of two witnesses.

THOMAS GRISENTHWAITE.

Witnesses:
ARBA N. LINCOLN,
EDMUND V. DOMINGUE.